ELECTRO-OPTICAL DIGITAL SYSTEM

INVENTORS
ROY H. CORNELY &
JOSEPH R. BURNS
BY Carl V. Olson
Attorney

ELECTRO-OPTICAL DIGITAL SYSTEM

INVENTORS.
ROY H. CORNELY &
JOSEPH R. BURNS
BY Carl V. Olson
Attorney

United States Patent Office 3,319,080

Patented May 9, 1967

3,319,080

ELECTRO-OPTICAL DIGITAL SYSTEM

Roy H. Cornely, Monmouth Junction, and Joseph R. Burns, Trenton, N.J., assignors to Radio Corporation of America, a corporation of Delaware Filed Apr. 8, 1964, Ser. No. 358,164
14 Claims. (Cl. 307—88.5)

This invention relates to electro-optical digital systems for performing logic functions in electronic data processing apparatus, and particularly to systems employing one or more of the following types of solid-state devices: p-n junction photodiodes, negative-resistance or tunnel diodes and laser diodes.

The speed of operation of a digital binary information-handling system depends on: the speed with which the devices used therein can switch between two distinct "0" and "1" information states; the speed with which "0" and "1" information signals can be transmitetd from one device to a logically following device or devices; and the signal gain or "fan-out" characteristic of the devices used. Previously known systems have been limited in speed of operation by one or another of these factors. For example, systems utilizing the very fast switching characteristics of tunnel diode devices have been limited by strict tolerance requirements and limited signal fan-out abilities.

It is therefore a general object of this invention to provide an improved digital system wherein logic circuit units are very fast in switching between "0" and "1" states, and are capable of propagating standard-level signals at the speed of light in a transmission medium to a large number of other logic units.

It is another object to provide an improved digital system wherein "0" and "1" information signals are represented by the absence or presence of coherent light, and wherein a p-n junction photodiode and a negative resistance diode (tunnel diode) are used to etsablish a switching threshold for distinguishing between "0" and "1" input light signals.

According to one illustrative example of the invention, there is provided a tunnel diode circuit having a low voltage state and a high voltage state. The state of the tunnel diode is controlled by an input-light-signal-responsive back-biased p-n junction photodiode electrically connected to the tunnel diode. A coherent-light-emitting laser diode is electrically connected to the tunnel diode circuit so that the laser diode receives an amount of current determined by the state of the tunnel diode. A p-n junction diode light amplifier is positioned to receive and amplify a coherent light output signal generated by the laser diode. The light output signal from the light amplifier may be directed by means of an optical light splitter to the light inputs of many other similar systems in a logic-performing apparatus.

Figure 1:
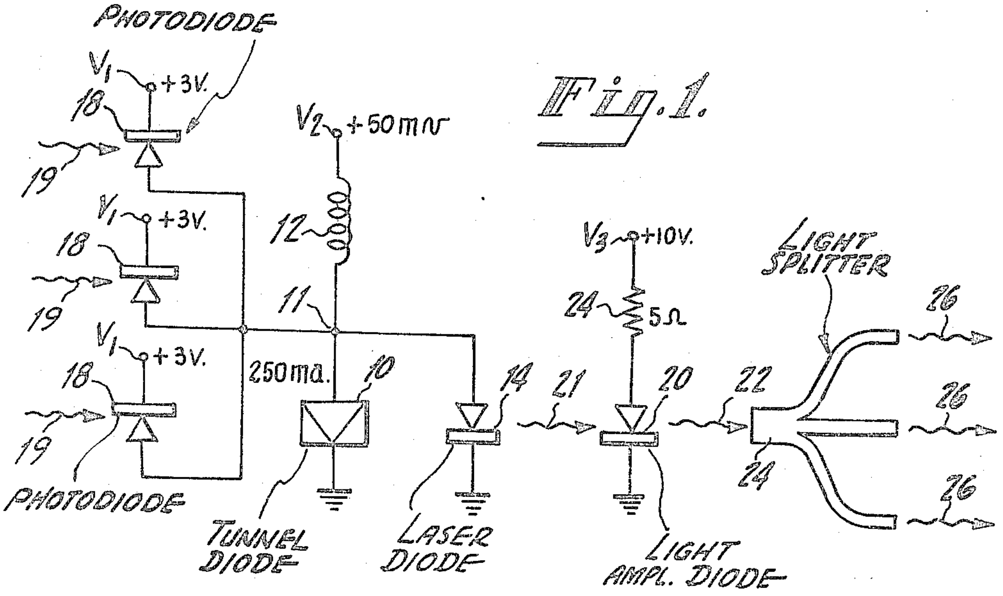
FIG. 1 is a diagram of a light signal handling system or unit constructed according to the teachings of the invention.
Figure 3:
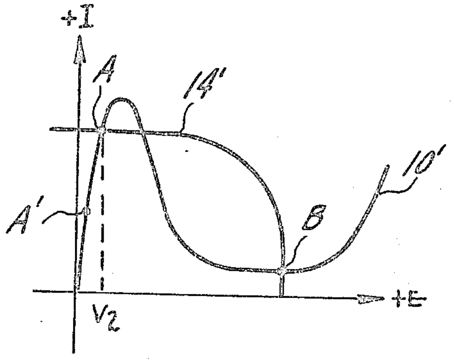
FIG. 3 is a characteristic chart which will be referred to in describing the operation of the tunnel diode and laser diode included in the system of FIG. 1.

Referring now in greater detail to FIG. 1, there is shown a tunnel diode circuit including, in series, a negative resistance or tunnel diode 10, a junction point 11, an inductor 12 and a positive terminal $V_2$ of a direct current bias source providing a positive voltage in relation to a ground or reference value. The tunnel diode 10 is preferably a gallium arsenide diode having the usual current-voltage character 10' as shown in FIG. 3, and having a peak current sufficiently higher than its valley current so that its output current exceeds the lasing threshold of a laser diode to be described.

A laser diode 14 is connected as a load across the tunnel diode 10. The laser diode 14, when viewed as a load on the tunnel diode 10, may have a current-voltage characteristic 14' as shown in FIG. 3. A laser diode may consist of a gallium arsenide wafer having a planar p-n junction extending to edges of the wafer. Two opposite edges of the wafer are spaced an appropriate distance apart and are partially reflecting so that when a sufficient electrical current is supplied to the terminals of the diode, coherent light oscillations build up in the planar junction and are radiated from an edge of the wafer. Additional information on gallium arsenide laser diodes is given in the following articles; M. I. Nathan et al., Applied Physics Letters, vol. 1, page 62 (1962); R. N. Hall et al., Physical Review Letters, vol. 9, page 366 (1962); G. Burns et al., IBM Journal, January 1963, pages 62–65; G. E. Fenner et al., Journal of Applied Physics, vol. 34, No. 11, November 1963, p. 3204; and T. M. Quist, International Science and Technology, February 1964, pp. 80–88.

A light-signal responsive input circuit for the tunnel diode 10 includes a plurality of photodiodes 18 connected in parallel between the positive terminals $V_1$ of a bias source and the anode terminal 11 of the tunnel diode 10. The p-n junction photodiodes 18 are preferably silicon diodes. Information on the construction and use of p-n junction photodiodes is given in an article by H. S. Sommers, Jr., at pages 140 through 146 of the January 1963, issue of the Proceedings of the IEEE, and in an article by G. Lucovsky et al. at pages 166 through 172 of the January 1963 issue of the Proceedings of the IEEE.

The p-n junction photodiodes 18 in FIG. 1 are back-biased by having their cathodes connected to positive voltage sources $V_1$. When a photodiode is thus back-biased, and when no input light signal is applied to the diode, the diode presents a high impedance to the flow of current in the reverse direction through the diode as represented by the current-voltage characteristic 18' in the chart of FIG. 2. On the other hand, when an input light signal is supplied to the junction region of the back-biased photodiode, a large reverse current flows through the diode as represented by the characteristic 18'' in FIG. 2. The substantially horizontal disposition of the left-biased portion of the characteristic 18'' indicates that the reverse current flowing through the photodiode is substantially constant over a considerable range of values of reverse voltage across the photodiode. A reverse current through a photodiode 18 passes in the forward direction through the tunnel diode 10.

A p-n junction diode light amplifier 20 in FIG. 1 is positioned to receive coherent light radiated from the laser diode 14 over the path 21. The amplifier diode 20, in turn, radiates an amplified, directional, narrow-frequency coherent light signal over the path 22. In the absence of a coherent light input to the amplifier diode 20, its light output is non-directional and non-coherent. The light amplifier diode 20 is part of a light amplifier circuit which also includes a resistor 24 and the positive terminal $V_3$ of a voltage source. The resistor 24 and the voltage at terminal $V_3$ constitute a substantially constant current bias source for the light amplifier diode 20. The light amplifier diode 20 is preferably a gallium arsenide diode similar to the laser diode 14 but differing from the laser diode 14 in some of its physical dimensions. The amplifier diode 20 is also different in having light-transmitting coatings on the edge of the wafer to which light is supplied over the path 21, and on the edge from which amplified light is transmitted over path 22. Further information regarding light amplification by gallium arsenide diodes is given in an article by J. W. Crowe on pages 57 and 58 of the February 1, 1964, issue of the Applied Physics Letters, vol. 4, No. 3.

The amplified light output from the light amplifier diode 20 is applied over path 22 to the input of an optical light splitter 24. The light splitter 24 may consist of optical fibers for splitting and directing light over paths 26 to individual photodiodes, corresponding with the photodiodes 18, of other following units in a logic system. The light splitter 24 may, alternatively, consist of a system of partially and totally reflective surfaces providing separated and substantially equal-intensity light signals along separated paths 26.

The number of signal inputs 19 (fan-in) and the number of signal outputs 26 (fan-out) may be fewer or considerably greater in number than the illustrative number shown in FIG. 1. The values shown for bias sources and circuit elements are suggested illustrative values, subject to engineering modification.

All of the presently-known photodiodes, laser diodes and light amplifying diodes suitable for use in the arrangement of FIG. 1 are operable at very high speeds and have the desired characteristics when they are maintained at temperatures considerably lower than room temperatures. It is therefore desirable, at the present time, to operate the arrangement of FIG. 1 at a reduced temperature such as the temperature of liquid nitrogen (−178° C.) or liquid air. It is contemplated that semi-conductor laser devices available in the future may be capable of operation with the desired characteristics at room temperatures. Available photodiodes and tunnel diodes operate satisfactorily at room temperatures and they operate as well or even better at greatly reduced temperatures. The photodiodes, laser diodes, light amplifying diodes and tunnel diodes are all switchable from one condition to another in a fraction of a nanosecond (in a fraction of a thousandth of a microsecond).

In operation, the arrangement of FIG. 1 may be employed as an "or" gate, or as an "and" gate, for light signals, by appropriately adjusting the electric bias sources. If operation as an "or" gate is desired, the tunnel diode 10 and the laser diode 14 are biased to provide the characteristics relationship of curves 10′ and 14′ in FIG. 3. The tunnel diode 10 is normally in its low-voltage, high-current state represented by the point A. In this normal condition, with the voltage $V_2$ across the laser diode 14, the laser diode 14 presents a high impedance and very little current flows through it. Substantially all of the current from the source $V_2$ flows through the tunnel diode 10.

Figure 2:
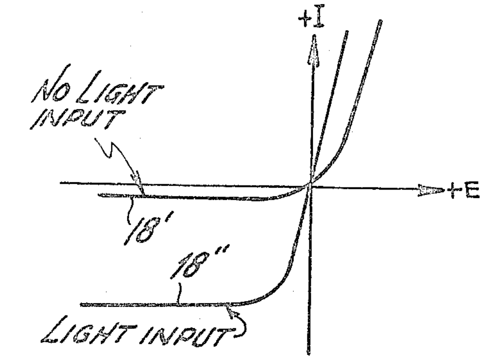
FIG. 2 is a characteristic chart which will be referred to in describing the operation of the photodiodes in the system of FIG. 1.

In the absence of an input light signal directed over paths 19 to any one of the photodiodes 18, the back-biased photodiodes 18 present a high impedance to a reverse flow of current as represented by the characteristic 18′ in FIG. 2. When a light signal is directed over a path 19 to one of the photodiodes 18, the current-voltage characteristic of the photodiode changes and becomes the characteristic 18″. Under this condition, a large reverse current is permitted to flow through the photodiode 18 from the bias terminal $V_1$ to the anode terminal 11 of the tunnel diode 10. This additional current supplied in the forward direction through the tunnel diode 10 causes its operating point to rise from the point A over the current peak of the characteristic shown in FIG. 3, and to switch rapidly to the right to its high voltage state with an operating point at B.

When the tunnel diode is in its high voltage state as represented by the point B, most of the current which was previously flowing from the $V_2$ terminal through the tunnel diode 10 is diverted to the parallel path including the laser diode 14. The current now flowing through the laser diode 14 is of sufficient magnitude to cause lasing in the diode 14 and the emission of high-intensity coherent light over the path 21. The coherent light output of laser diode 14 is amplified in the light amplifier diode 20 and is directed through the light splitter to inputs of other logic units.

The tunnel diode circuit shown is a monostable circuit in which the operating point of the tunnel diode 10 automatically returns from the operating point B to the normal operating point A after a period of time determined primarily by the value of the inductor 12. When the tunnel diode 10 returns to the operating point A, the current previously supplied to the laser diode 14 is diverted back to the tunnel diode 10 and the laser diode 14 ceases to generate a coherent light output.

In summary, an input light signal pulse applied to a photodiode 18 results in a plurality of output light pulses of standard duration from the light splitter 24.

If the arrangement of FIG. 1 is desired to operate as an "and" gate, the biasing of the tunnel diode 10 is arranged so that all of the input photodiodes 18 must be receiving input light signals at the same time in order that they can supply enough current to the tunnel diode 10 to switch its operating point from point A, over the current peak, to point B. In other respects, the operation will be understood from what is described above.

Figure 4:
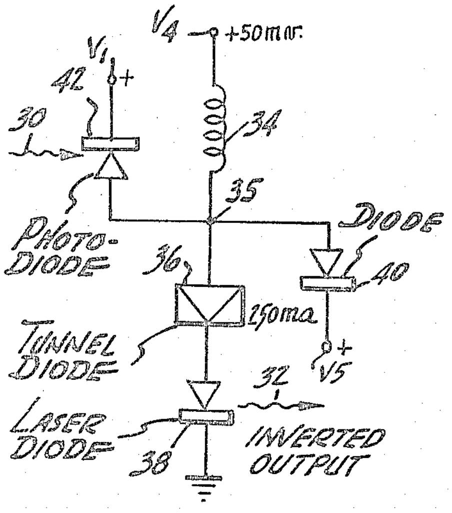
FIG. 4 is an inverter circuit which may be substituted for part of the system of FIG. 1.

FIG. 4 shows an inverter circuit wherein the presence of an input light signal 30 results in the absence of an output light signal 32, and vice versa. The inverter circuit includes the positive terminal $V_4$ of a bias source connected in series in the order named through an inductor 34, a junction point 35, a tunnel diode 36 (anode to cathode) and a laser diode 38 (anode to cathode). A p-n junction diode 40 is connected between the junction point 35 and a positive terminal $V_5$ of a bias source. The diode 40 is preferably a p-n junction diode which has electrical characteristics similar to the electrical characteristics of the laser diode 38, but which need not have any optical characteristics. A photodiode 42 is connected in back-biased relation between the positive terminal $V_1$ of a bias source and the anode terminal 35 of the tunnel diode 36.

Figure 5:
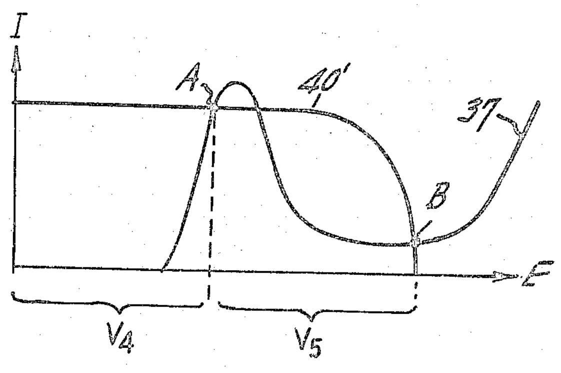
FIG. 5 is a characteristic chart which will be referred to in describing the operation of the circuit of FIG. 4.

The current-voltage characteristic of the series combination of the tunnel diode 36 and the laser diode 38 is a characteristic 37 as represented in FIG. 5. The characteristic 37 is derived graphically by adding the separate characteristics of the tunnel diode and the laser diode, in the voltage direction E. The p-n junction diode 40 is biased by the positive voltage source $V_5$ to provide the load characteristic 40′ in the desired relationship with the characteristic 37, i.e. to provide one stable intersection at a low voltage, high current point A and another stable intersection at a high voltage, low current point B. The voltage source $V_5$ may, if desired, be replaced by another p-n junction diode in series with the p-n junction diode 40 to provide the load characteristic 40′.

In the operation of the light signal inverter circuit of FIG. 4, current normally flows from the bias terminal $V_4$ through the inductor 34, the tunnel diode 36 and the laser diode 38. The operating point of the tunnel diode and laser diode characteristic 37 is normally at the point A. Substantially no current normally flows through the diode 40. The large current flowing through the tunnel diode 36 and the laser diode 38 causes coherent light to be normally emitted over the path 32 from the laser diode 38.

The normal condition of the circuit of FIG. 4, which has been described, is the condition existing when there is no input light signal applied over path 30 to the photodiode 42. When an inutput light signal is applied to the photodiode 42, current flows from the bias terminal $V_1$ and through the photodiode 42 to the tunnel diode 36, causing the operating point of the tunnel diode to switch from point A to point B. When this happens, the majority of the current which was previously flowing through the tunnel diode 36 and the laser diode 38 is diverted to the parallel path including the diode 40. The reduction in current through the laser diode 38 causes it to cease emitting coherent light. The laser diode 38 does not resume the emission of coherent light until after the operating point of the tunnel diode switches back to the low voltage, high current state operating point A at a time determined primarily by the reactive effect of the inductor 34.

The inverted light output supplied at 32 by the circuit of FIG. 4 results from the fact that the laser diode 38 is in series with the tunnel diode 36, rather than being in parallel with the tunnel diode as is the case in the arrangement of FIG. 1. The light signal output 32 from the laser diode 38 in FIG. 4 may be supplied to a light amplifying diode 20 and a light splitter 24 as shown in FIG. 1 before being directed to the input of another following logic unit.

Figure 6:
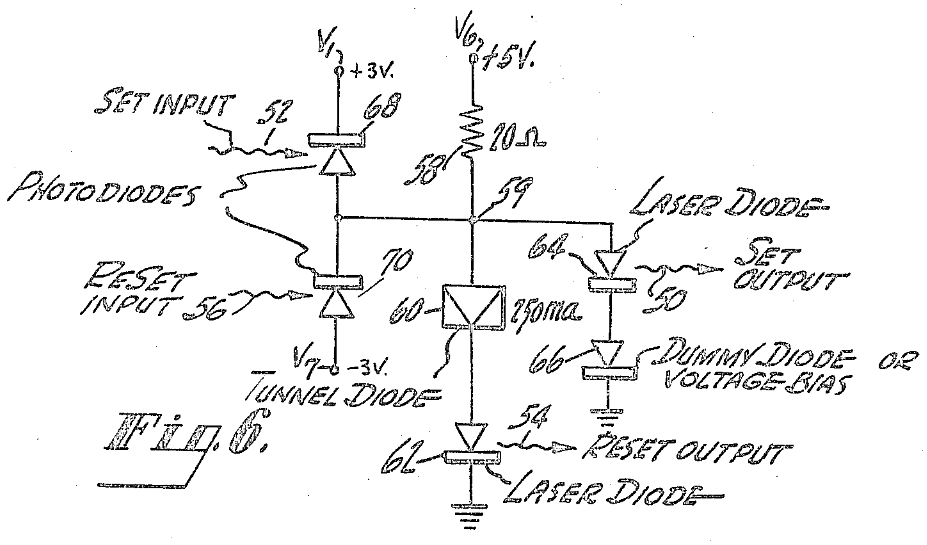
FIG. 6 is a diagram of a bistable circuit having set and reset light inputs and outputs.

FIG. 6 shows a bistable circuit which supplies an output light signal from a set output 50 after having received an input light signal at a set input 52, and which supplies an output light signal from a reset output 54 after having received an input light signal at a reset input 56. The circuit of FIG. 6 includes, in series, a positive terminal $V_6$ of a bias source, a resistive impedance 58, a junction point 59, a tunnel diode 60 and a laser diode 62. The bias voltage at terminal $V_6$ and the resistor 58 are selected to constitute a substantially constant-current source connected to the junction point 59.

A laser diode 64 and a dummy diode 66 are connected in series from the junction point 59 to the circuit return path represented by ground. A first photodiode 68 is connected in back-biased relation between the positive bias source $V_1$ and the junction point 59. A second photodiode 70, for reset purposes, is connected in back biased relationship between a negative bias source terminal $V_7$ and the junction point 59.

The combined characteristic of the tunnel diode 60 and the laser diode 62 may be as represented by the characteristic 37 in FIG. 5; and the load characteristic of the laser diode 64 and the dummy diode 66 may be a characteristic such as characteristic 40′ in FIG. 5. The use of a resistor 58 in FIG. 5, instead of the inductor 34 in FIG. 4, makes the circuit of FIG. 6 a bistable circuit having stable operating points at A and B.

In the operation of the circuit of FIG. 6, it is initially assumed that the circuit is in its reset condition with the tunnel diode 60 in its low voltage state and with its operating point at the point A in FIG. 5. Under this condition, a large current flows through the tunnel diode 60 and the laser diode 62 causing the laser diode 62 to emit coherent light as a reset output signal at 54.

If an input light signal is now applied at the set input 52 to the photodiode 68, the photodiode 68 becomes conductive and the current flowing to the anode terminal 59 of the tunnel diode 60 causes the tunnel diode to switch to its high voltage state with an operating point at B. When this happens, the current previously flowing through tunnel diode 60 and laser diode 62 is diverted to the laser diode 64. This causes laser diode 62 to cease emitting light, and causes laser diode 64 to emit set output coherent light at 50. The circuit will remain indefinitely in this condition, providing a coherent output light signal 50 from the set output of the circuit.

To reset the circuit of FIG. 6, a light signal is applied at 56 to the reset input photodiode 70. The light impinging on photodiode 70 changes its electrical characteristic so that it passes current from the junction point 59 in the reverse direction through the photodiode 70 to the bias terminal $V_7$. This current flow reduces the current supplied previously from the terminal $V_6$ to the tunnel diode 60. The reduction in current available to the tunnel diode 60 causes its operating point to switch from the point B back to the low voltage state operating point A. When in the low voltage operating state, the increased current through the tunnel diode and the laser diode 62 causes a reset light signal output at 54. At the same time, the current through laser diode 64 is reduced so that the set output light at 50 ceases. The circuit of FIG. 6 always provides one or the other of its two coherent light signal outputs depending on which of its inputs most recently received an input light signal.

The outputs from the bistable circuit of FIG. 6 may each be amplified and split by a light amplifier and light splitter as shown in FIG. 4. It will be understood that the inverter circuit of FIG. 1 and the bistable circuit of FIG. 6 may be provided with multiple photodiode input circuits after the manner illustrated in FIG. 1.

The logic units shown and described employ various semi-conductor devices all of which have high inherent operating speeds. The semi-conductor devices are used in a way providing a clear threshold distinguishing "0" and "1" information conditions. The logic units have a high fan-out capability. That is, a logic unit is capable, in the performance of logic functions, of providing many standard-level light output signals for application to inputs of many following logic units. Also, ouptut signals in the form of coherent light can be transmitted from the output of one logic unit to the input of another logic unit at the speed of light in a transmission medium.

What is claimed is:

1. The combination of:
a tunnel diode circuit including a tunnel diode having a low voltage state and a high voltage state,
a laser diode connected in series with said tunnel diode, and
a back-biased p-n junction photodiode responsive to an input light signal and coupled to said tunnel diode to change the voltage state of the tunnel diode.

2. The combination of:
a negative resistance diode circuit including a two-state negative resistance diode,
a laser diode connected in said negative resistance diode circuit to receice an amount of current determined by the state of said negative resistance diode, and
a light signal responsive input circuit means electrically coupled to said negative resistance diode to switch it from one state to another.

3. The combination of:
a tunnel diode circuit including a tunnel diode having a low voltage state and a high voltage state,
a laser diode connected in said tunnel diode circuit to receive an amount of current determined by the state of said tunnel diode, and
a light signal input circuit including a bias source, and at least one p-n junction photodiode detector connected in back-biased polarity between said bias source and said tunnel diode.

4. A light signal system, comprising:
a tunnel diode circuit including a tunnel diode having a low voltage state and a high voltage state,
a laser diode connected in said tunnel diode circuit to receive an amount of current determined by the state of said tunnel diode,
an input circuit including a bias source, and at least one p-n junction photodiode detector connected in back-biased polarity between said bias source and said tunnel diode,
whereby input light impinging on said photodiode detector causes it to conduct and causes said tunnel diode to switch from one of its voltage states to the other,
a p-n junction light amplifier positioned to receive and amplify coherent light from said laser diode, and
a light splitter positioned to direct light from said light amplifier to inputs of a plurality of other light signal systems.

5. A light signal system comprising:

a tunnel diode circuit including a tunnel diode having two voltage states, a laser diode connected as a load across said tunnel diode, a light signal input circuit including a bias source and at least one p-n junction photodiode detector connected in back-biased polarity between said bias source and said tunnel diode, and a p-n junction diode light amplifier positioned to receive and amplify coherent light from said laser diode.

6. A light signal system as defined in claim 5 wherein said tunnel diode circuit is a monostable circuit.

7. A light signal system as defined in claim 5 wherein said tunnel diode circuit is a bistable circuit.

8. The combination of:

a parallel circuit having one parallel current path including a two-state negative resistance diode and having another parallel current path including a laser diode, a bias current source connected to supply a current to said parallel circuit, and input means coupled to said negative resistance diode to switch it from one state to another.

9. The combination of:

a parallel circuit having one parallel current path including a tunnel diode and having another parallel current path including a laser diode, a bias current source connected to supply a current to said parallel circuit which flows through said tunnel diode when the tunnel diode is in its low-voltage state and which flows through said laser diode when the tunnel diode is in its high voltage state, and a back-biased p-n junction photodiode responsive to an input light signal and coupled to said tunnel diode to change the voltage state of the tunnel diode.

10. The combination of:

a parallel circuit having one parallel current path including a tunnel diode and having another parallel current path including a laser diode, a bias current source connected to apply a current to said parallel circuit which flows through said tunnel diode when the tunnel diode is in its low-voltage state and which flows through said laser diode when the tunnel diode is in its high voltage state, and a p-n junction light amplifier positioned to receive and amplify coherent light from said laser diode.

11. The combination of:

a parallel circuit having one parallel current path including a tunnel diode and having another parallel current path including a laser diode, a bias current source connected to supply a current to said parallel circuit which flows through said tunnel diode when the tunnel diode is in its low-voltage state and which flows through said laser diode when the tunnel diode is in its high voltage state, a back-biased p-n junction photodiode responsive to an input light signal and coupled to said tunnel diode to change the voltage state of the tunnel diode, and a p-n junction light amplifier positioned to receive and amplify coherent light from said laser diode.

12. The combination of:

a parallel circuit having one parallel current path including the series combination of a tunnel diode and a first laser diode, and having another parallel current path including a second laser diode, a bias current source connected to supply a current to said parallel circuit which flows through said tunnel diode and first laser diode when the tunnel diode is in its low-voltage state and which flows through said second laser diode when the tunnel diode is in its high voltage state, and a back-biased p-n junction photodiode responsive to an input light signal and coupled to said tunnel diode to change the voltage state of the tunnel diode.

13. The combination of:

a parallel circuit having one parallel current path including the series combination of a tunnel diode and a first laser diode, and having another parallel current path including a second laser diode, a bias current source connected to supply a current to said parallel circuit which flows through said tunnel diode and first laser diode when the tunnel diode is in its low-voltage state and which flows through said second laser diode when the tunnel diode is in its high voltage state, and two oppositely-poled back-biased p-n junction photodiode detectors coupled to said tunnel diode, whereby input light impinging on one of said photodiode detectors causes said tunnel diode to switch from its low voltage state to its high voltage state, and whereby input light impinging on the other one of said photodiode detectors causes said tunnel diode to switch from its high voltage state to its low voltage state.

14. The combination defined in claim 13, and in addition, first and second p-n junction light amplifiers positioned to receive and amplify coherent light from said first and second laser diodes, respectively.

References Cited by the Examiner

UNITED STATES PATENTS 3,258,596 6/1966 Green ------------- 250—199

References Cited by the Applicant

FOREIGN PATENTS 1,079,113 4/1960 Germany.

OTHER REFERENCES

IBM Technical Disclosure Bulletin, vol. 3, No. 3, August 1960, page 38, I. G. Akmenkalns and E. Pasternak—Optically Controlled Latch Circuit.

IBM Technical Disclosure Bulletin, vol. 4, No. 12, May 1962, page 71, M. Masetti—Light Sensor.

ARTHUR GAUSS, *Primary Examiner.*

D. D. FORRER, *Assistant Examiner.*